United States Patent
Zobel et al.

(10) Patent No.: US 6,753,364 B1
(45) Date of Patent: Jun. 22, 2004

(54) FLAME-RESISTANT POLYCARBONATE MOLDING MATERIALS

(75) Inventors: Michael Zobel, Köln (DE); Thomas Eckel, Dormagen (DE); Torsten Derr, Dormagen (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 162 days.

(21) Appl. No.: 10/070,017

(22) PCT Filed: Aug. 22, 2000

(86) PCT No.: PCT/EP00/08172

§ 371 (c)(1),
(2), (4) Date: Feb. 27, 2002

(87) PCT Pub. No.: WO01/18106

PCT Pub. Date: Mar. 15, 2001

(30) Foreign Application Priority Data

Sep. 2, 1999 (DE) .......................... 199 41 826

(51) Int. Cl.$^7$ ............................................. C08K 5/5399
(52) U.S. Cl. ........................ 524/117; 524/139; 524/148
(58) Field of Search ................................. 524/117, 139, 524/148

(56) References Cited

U.S. PATENT DOCUMENTS

| | | | |
|---|---|---|---|
| 3,505,431 A | 4/1970 | Birum | 558/126 |
| 3,711,577 A | 1/1973 | Maier | 558/158 |
| 4,054,544 A | 10/1977 | Albright | 521/155 |
| 4,073,767 A | 2/1978 | Birum | 524/118 |
| 4,397,750 A | 8/1983 | Chibnik | 252/51.5 A |
| 5,061,745 A | 10/1991 | Wittmann et al. | 524/139 |
| 5,204,394 A | 4/1993 | Gosen et al. | 524/125 |
| 5,276,066 A | 1/1994 | Paulik et al. | 521/108 |
| 5,578,666 A | 11/1996 | Weil et al. | 524/100 |
| 5,672,645 A | 9/1997 | Eckel et al. | 524/127 |
| 5,844,028 A | 12/1998 | Paulik | 524/117 |
| RE36,902 E | 10/2000 | Eckel et al. | 524/127 |
| 6,528,561 B1 * | 3/2003 | Zobel et al. | 524/125 |

FOREIGN PATENT DOCUMENTS

| | | |
|---|---|---|
| EP | 0 594 553 | 4/1994 |
| FR | 1371139 | 8/1964 |

* cited by examiner

*Primary Examiner*—Peter Szekely
(74) *Attorney, Agent, or Firm*—Joseph C. Gil; Aron Preis

(57) ABSTRACT

A flame retardant molding composition is disclosed. The composition that contains polycarbonate and/or polyester carbonate and a phosphonate amines is characterized by its good level of mechanical properties, especially a high heat resistance, and exhibits low-juicing. An embodiment wherein the composition further contains a graft polymer is also disclosed.

19 Claims, No Drawings

FLAME-RESISTANT POLYCARBONATE MOLDING MATERIALS

The present invention relates to polycarbonate moulding compositions incorporating phosphonate amines, which are flame resistant and have a good level of mechanical properties, especially a high heat resistance, and are low-juicing.

U.S. Pat. Nos. 4,073,767 and 5,844,028 describe cyclic phosphorus compounds, including phosphorinane rings, as suitable flame retardants for polyurethanes, polyesters, polycarbonates and polyamides. In U.S. Pat. No. 4,397,750, certain cyclic phosphonate esters are described as efficient flame retardants for polypropylene and other polyolefins. In U.S. Pat. Nos. 5,276,066 and 5,844,028 certain (1,3,2-dioxaphosphorinane methane)amines are described which can be used as flame retardants in polyurethanes, polyesters, styrene polymers, polyvinyl chloride, polyvinyl acetate or polycarbonate.

U.S. Pat. No. 3,505,431, French Patent 1 371 139, U.S. Pat. Nos. 3,711,577, 4,054,544 describe acyclic triphosphonate amines which are partly halogenated.

In EP-A 0 640 655, moulding compositions of aromatic polycarbonate, styrene-containing copolymers and graft polymers are described, which can be rendered flame resistant with monomeric and/or oligomeric phosphorus compounds.

In EP-A 0 363 608, flame-resistant polymer mixtures of aromatic polycarbonate, styrene-containing copolymer or graft copolymer and oligomeric phosphates as flame retardants are described. For some applications, such as for example moulded parts in the interior of housing parts, the heat resistance of these mixtures is often inadequate.

In U.S. Pat. No. 5,061,745 polymer mixtures of aromatic polycarbonate, ABS graft polymer and/or styrene-containing copolymer and monophosphates as flame retardants are described. The level of the stress cracking resistance of these mixtures is often inadequate for producing thin-walled housing parts.

The object of the present invention is therefore to provide flame-resistant PC moulding compositions which have excellent heat resistance, good mechanical properties and low volatility of the phosphorus components in the moulding composition (low-juicing).

Surprisingly, it has now been found that, by using the phosphonate amines according to the invention, flame-resistant moulding compositions are obtained which give mouldings with a very good level of mechanical properties and outstanding heat resistance.

The invention therefore provides compositions containing polycarbonate and 0.1 to 30 parts by weight, preferably 1 to 25 parts by weight, particularly preferably 2 to 20 parts by weight, phosphonate amine of formula (I)

$$A_{3-y}\text{—N—}B_y \quad (I),$$

in which

A denotes a group of the formula (IIa)

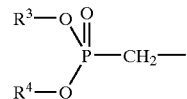

(IIa)

or (IIb)

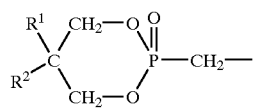

(IIb)

$R^1$ and $R^2$, independently of one another, denote unsubstituted or substituted $C_1$–$C_{10}$ alkyl or unsubstituted or substituted $C_6$–$C_{10}$ aryl, $R^3$ and $R^4$, independently of one another, denote unsubstituted or substituted $C_1$–$C_{10}$ alkyl or unsubstituted or substituted $C_6$–$C_{10}$ aryl, or $R^3$ and $R^4$ together denote unsubstituted or substituted $C_3$–$C_{10}$ alkylene, y signifies the numerical values 0, 1 or 2 and B independently denotes hydrogen, optionally halogenated $C_2$–$C_8$ alkyl, unsubstituted or substituted $C_6$–$C_{10}$ aryl.

The present invention preferably provides flame-resistant blends containing

A) 5 to 95, preferably 10 to 90 parts by weight, particularly preferably 20 to 80 parts by weight, aromatic polycarbonate and/or polyester carbonate B) 1 to 60, preferably 1 to 40 parts by weight, particularly preferably 2 to 30 parts by weight, of at least one graft polymer of
   B.1 5 to 95, preferably 20 to 60 wt. % one or more vinyl monomers on
   B.2 5 to 95, preferably 40 to 80 wt. % one or more polymer backbones with a glass transition temperature of <10° C., preferably 0° C., particularly preferably <–20° C. and an average particle size ($d_{50}$ value) of 0.05 to 5 µm, preferably 0.20 to 0.35 µm, particularly preferably 0.25 to 0.30 µm, C) 0 to 50, preferably 1 to 30, particularly preferably 2 to 25, parts by weight thermoplastic vinyl (co)polymer and/or polyalkylene terephthalate, D) 0.1 to 30 parts by weight, preferably 1 to 25 parts by weight, particularly preferably 2 to 20 parts by weight, phosphonate amine of formula (I)

$$A_{3-y}\text{—N—}B_y \quad (I),$$

in which

A, B and y have the meaning given above and

E) 0 to 5 parts by weight, preferably 0.1 to 1 part by weight, particularly preferably 0.1 to 0.5 parts by weight, fluorinated polyolefin, the sum of the parts by weight of all the components A+B+C+D+E making 100.

Component A

Aromatic polycarbonates and/or aromatic polyester carbonates as in component A which are suitable according to the invention are known from the literature or can be prepared by methods known from the literature (for the preparation of aromatic polycarbonates see for example Schnell, "Chemistry and Physics of Polycarbonates", Interscience Publishers, 1964, and DE-AS 1 495 626, DE-OS 2 232 877, DE-OS 2 703 376, DE-OS 2 714 544, DE-OS 3 000 610, DE-OS 3 832 396; for the preparation of aromatic polyester carbonates e.g. DE-OS 3 077 934).

Aromatic polycarbonates are prepared e.g. by reacting diphenols with carbonic acid halides, preferably phosgene and/or with aromatic dicarboxylic acid dihalides, preferably benzenedicarboxylic acid dihalides, by the phase boundary process, optionally using chain terminators, for example monophenols, and optionally using trifunctional or more than trifunctional branching agents, for example triphenols or tetraphenols.

Diphenols for the preparation of the aromatic polycarbonates and/or aromatic polyester carbonates are preferably those of formula (III)

$$\text{(III)}$$

wherein $A^1$ is a single bond, $C_1$–$C_5$ alkylene, $C_2$–$C_5$ alkylidene, $C_5$–$C_6$ cycloalkylidene, —O—, —SO—, —CO—, —S—, —SO$_2$—, $C_6$–$C_{12}$ arylene, which can be condensed with other aromatic rings optionally containing heteroatoms, or a group of the formula $$\text{(IV)}$$

or a group of the formula (V)

$$\text{(V)}$$

B independently of one another, is $C_1$–$C_8$ alkyl, preferably $C_1$–$C_4$ alkyl especially methyl, halogen, preferably chlorine and/or bromine, $C_6$–$C_{10}$ aryl, preferably phenyl, $C_7$–$C_{12}$ aralkyl, phenyl $C_1$–$C_4$ alkyl, preferably benzyl, x each independently of one another, is 0, 1 or 2, p is 1 or 0 and $R^5$ and $R^6$, selectable individually for each Z, independently of one another, signify hydrogen or $C_1$–$C_6$ alkyl, preferably hydrogen, methyl and/or ethyl, Z signifies carbon and m signifies an integer from 4 to 7, preferably 4 or 5, with the proviso that, on at least one atom Z, $R^5$ and $R^6$ are both alkyl.

Preferred diphenols are hydroquinone, resorcinol, 4,4'-dihydroxydiphenyl, bis(hydroxyphenyl) $C_1$–$C_5$ alkanes, bis(hydroxyphenyl) $C_5$–$C_6$ cycloalkanes, bis(hydroxyphenyl) ethers, bis(hydroxyphenyl) sulfoxides, bis(hydroxyphenyl) ketones, bis(hydroxyphenyl) sulfones and α,α-bis(hydroxyphenyl) diisopropylbenzenes and the ring-brominated and/or ring-chlorinated derivatives thereof.

Particularly preferred diphenols are 4,4'-diphenylphenol, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenyl sulfide, 4,4'-dihydroxydiphenyl sulfone and the di- and tetrabrominated or chlorinated derivatives thereof such as, for example, 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane.

2,2-Bis(4-hydroxyphenyl)propane (bisphenol A) is particularly preferred.

The diphenols can be used individually or as any mixtures.

The diphenols are known from the literature or are obtainable by methods known from the literature.

Suitable chain terminators for the preparation of the thermoplastic, aromatic polycarbonates are, for example, phenol, p-chlorophenol p-tert.-butylphenol or 2,4,6-tribromophenol, but also long-chain alkylphenols, such as 4-(1,3-tetramethylbutyl)phenol according to DE-OS 2 842 005 or monoalkylphenol or dialkylphenols with a total of 8 to 20 C atoms in the alkyl substituents, such as 3,5-di-tert.-butylphenol, p-isooctylphenol, p-tert-octylphenol, p-dodecylphenol and 2-(3,5-dimethylheptyl)phenol and 4-(3,5-dimethylheptyl)phenol. The quantity of chain terminators to be used is generally between 0.5 mole % and 10 mole %, based on the sum of moles of the diphenols used in each case.

The thermoplastic, aromatic polycarbonates have average weight average molecular weights ($M_w$, measured e.g. by ultracentrifuge or nephelometry) of 10 000 to 200 000, preferably 20 000 to 80 000.

The thermoplastic, aromatic polycarbonates can be branched by known means, preferably by incorporating 0.05 to 2.0 mole %, based on the sum of the diphenols used, of ≧trifunctional compounds, e.g. those with ≧three phenolic groups.

Both homopolycarbonates and copolycarbonates are suitable. To prepare copolycarbonates according to the invention as component A, it is also possible to use 1 to 25 wt. %, preferably 2.5 to 25 wt. % (based on the total quantity of diphenols to be used), polydiorganosiloxanes with hydroxyaryloxy end groups. These are known (cf. for example U.S. Pat. No. 3,419,634) or can be prepared by methods known from the literature. The preparation of polydiorganosiloxane-containing copolycarbonates is described e.g. in DE-OS 3 334 782.

Preferred polycarbonates are, in addition to bisphenol A homopolycarbonates, the copolycarbonates of bisphenol A with up to 15 mole %, based on the sums of moles of diphenols, other diphenols mentioned as preferred or particularly preferred, especially 2,2-bis(3,5-dibromo-4-hydroxyphenyl)propane.

Aromatic dicarboxylic acid dihalides for the preparation of aromatic polyester carbonates are preferably the diacid dichlorides of isophthalic acid, terephthalic acid, diphenyl ether-4,4'-dicarboxylic acid and of 2,6-naphthalenedicarboxylic acid.

Mixtures of the diacid dichlorides of isophthalic acid and terephthalic acid in a ratio of between 1:20 and 20:1 are particularly preferred.

In the preparation of polyester carbonates, a carbonic acid halide, preferably phosgene, is additionally incorporated as a bifunctional acid derivative.

In addition to the monophenols already mentioned, their chloroformates and the acid chlorides of aromatic monocarboxylic acids which can optionally be substituted by $C_1$–$C_{22}$ alkyl groups or by halogen atoms, and aliphatic $C_2$–$C_{22}$ monocarboxylic acid chlorides, are also suitable as chain terminators for the preparation of the aromatic polyester carbonates.

The quantity of chain terminators is 0.1 to 10 mole % in each case, based on moles of diphenol in the case of phenolic chain terminators and on moles of dicarboxylic acid dichlorides in the case of monocarboxylic acid chloride chain terminators.

The aromatic polyester carbonates can also contain incorporated aromatic hydroxycarboxylic acids.

The aromatic polyester carbonates can be both linear and branched by a known method (cf. also DE-OS 2 940 024 and DE-OS 3 007 934).

Examples of branching agents which can be used are trifunctional or polyfunctional carboxylic acid chlorides, such as trimesic acid trichloride, cyanuric acid trichloride, 3,3'-4,4'-benzophenonetetracarboxylic acid tetrachloride, 1,4,5,8-naphthalenetetracarboxylic acid tetrachloride or pyromellitic acid tetrachloride, in quantities of 0.01 to 1.0 mole % (based on dicarboxylic acid dichlorides used) or trifunctional or polyfunctional phenols, such as phloroglucinol, 4,6-dimethyl-2,4,6-tri(4-hydroxyphenyl)heptene-2, 4,4-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane, 2,6-bis(2-hydroxy-5-methylbenzyl)-4-methylphenol, 2-(4-hydroxyphenyl)-2-(2,4-dihydroxyphenyl)propane, tetra-(4-[4-hydroxyphenylisopropyl]phenoxy)methane, 1,4-bis[4,4'-dihydroxytriphenyl)methyl]benezene, in quantities of 0.01 to 1.0 mole %, based on diphenols used, Phenolic branching agents can be placed in the initial mixture with the diphenols; acid chloride branching agents can be added together with the acid dichlorides.

In the thermoplastic, aromatic polyester carbonates, the proportion of carbonate structural units can be varied at will.

The proportion of carbonate groups is preferably up to 100 mole %, especially up to 80 mole %, particularly preferably up to 50 mole %, based on the sum of ester groups and carbonate groups.

Both the ester portion and the carbonate portion of the aromatic polyester carbonates can be present in the form of blocks or randomly distributed in the polycondensate.

The relative solution viscosity ($\eta_{rel}$) of the aromatic polyester carbonates is in the range of 1.18 to 1.4, preferably 1.22 to 1.3 (measured on solutions of 0.5 g polyester carbonate in 100 ml methylene chloride solution at 25° C.).

The thermoplastic, aromatic polycarbonates and polyester carbonates can be used alone or in any mixture with one another.

Component B

Component B according to the invention represents graft polymers. These comprise graft copolymers with rubberelastic properties, which are substantially obtainable from at least 2 of the following monomers: chloroprene, 1,3-butadiene, isoprene, styrene, substituted styrenes, acrylonitrile, ethylene, propylene, vinyl acetate and (meth)acrylates with 1 to 18 C atoms in the alcohol component; i.e. polymers as described e.g. in "Methoden der Organischen Chemie" (Houben-Weyl), vol. 14/1, Georg Thieme-Verlag, Stuttgart 1961, p. 393–406 and in C. B. Bucknall, "Toughened Plastics", Appl. Science Publishers, London 1977. Preferred polymers B are partially crosslinked and possess gel contents of more than 20 wt. %, preferably more than 40 wt. %, especially more than 60 wt. %.

Preferred graft polymers B comprise graft polymers of:
B.1 5 to 95, preferably 30 to 80 parts by weight of a mixture of B.1.1 50 to 99 parts by weight styrene, α-methylstyrene, styrenes substituted in the ring with halogen or methyl, methyl methacrylate or mixtures of these compounds and B.1.2 1 to 50 parts by weight acrylonitrile, methacrylonitrile, methyl methacrylate, maleic anhydride, $C_1$–$C_4$ alkyl- or phenyl-N-substituted maleimides or mixtures of these compounds on B.2 5 to 95, preferably 20 to 70 parts by weight polymer with a glass transition temperature of less than –10° C., preferably based on diene and/or alkyl acrylate.

Particularly preferred as polymer backbone B.2 is polybutadiene with optionally up to 30 wt. % styrene or acrylonitrile as comonomer.

Preferred g polymers B are e.g. polymer backbones B.2 such as polybutadiene, butadiene/styrene copolymers and polyacrylate rubbers grafted with styrene and/or acrylonitrile and/or alkyl (meth)acrylates; i.e. copolymers of the type described in DE-OS 1 694 173 (=U.S. Pat. No. 3,564,077); polybutadienes, butadiene/styrene or butadiene/acrylonitrile copolymers, polyisobutenes or polyisoprenes grafted with alkyl acrylates or methacrylates, vinyl acetate, acrylonitrile, styrene and/or alkyl styrenes, as described e.g. in DE-OS 2 348 377 (=U.S. Pat. No. 3,919,353).

Particularly preferred polymers B are e.g. ABS polymers, as described e.g. in DE-OS 2 035 390 (=U.S. Pat. No. 3,644,574) or in DE-OS 2 248 242 (=GB-B 1 409 275).

Particularly preferred graft polymers B are obtainable by the grafting reaction of α 10 to 70, preferably 15 to 50, especially 20 to 40 wt. %, based on graft polymer B, of at least one (meth)acrylate or 10 to 70, preferably 15 to 50, especially 20 to 40 wt. % of a mixture of 10 to 50, preferably 20 to 35 wt. %, based on mixture, acrylonitrile or (meth)acrylate and 50 to 90, preferably 65 to 80 wt. %, based on mixture, styrene, as graft B.1 on β 30 to 90, preferably 50 to 85, especially 60 to 80 wt. %, based on graft polymer B, of a butadiene polymer with at least 50 wt. %, based on β, of butadiene groups as polymer backbone B.2.

The gel content of the polymer backbone β is preferably at least 70 wt. % (measured in toluene), the degree of grafting G 0.15 to 0.55 and the average particle diameter $d_{50}$ of the graft polymer B.2 0.05 to 2 μm, preferably 0.1 to 0.6 μm.

(Meth)acrylates α are esters of acrylic acid or methacrylic acid with monohydric alcohols with 1 to 18 C atoms. Particularly preferred are methyl methacrylate, ethyl methacrylate and propyl methacrylate, n-butyl acrylate, t-butyl acrylate and t-butyl methacrylate.

In addition to butadiene groups, the polymer backbone β can contain up to 50 wt. %, based on β, groups of other ethylenically unsaturated monomers, such as styrene, acrylonitrile, esters of acrylic or methacrylic acid with 1 to 4 C atoms in the alcohol component (such as methyl acrylate, ethyl acrylate, methyl methacrylate, ethyl methacrylate), vinyl esters and/or vinyl ethers. The preferred polymer backbone β consists of pure polybutadiene.

The degree of grafting G refers to the weight ratio of grafting monomers grafted on to the polymer backbone and is dimensionless.

The average particle size $d_{50}$ is the diameter above and below which 50 wt. % of the particles respectively lie. It can be determined by means of ultracentrifuge measurement (W. Scholtan, H. Lange, Kolloid, Z. und Z. Polymere 250 (1972), 782–796).

Particularly preferred polymers B are e.g. also graft polymers of

τ. 20 to 90 wt. %, based on component B, polyacrylate rubber with a glass transition temperature of <−20° C. as polymer backbone B.2 and δ 10 to 80 wt. %, based on component B, of at least one polymerisable, ethylenically unsaturated monomer as graft monomers C.1.

The polyacrylate rubbers τ of polymers B are preferably polymers of alkyl acrylates, optionally with up to 40 wt. %, based on τ, of other polymerisable, ethylenically unsaturated monomers. The preferred polymerisable acrylates include $C_1$–$C_8$ alkyl esters, e.g. methyl, ethyl, butyl, n-octyl and 2-ethylhexyl esters; halogen alkyl esters, preferably halogen $C_1$–$C_8$ alkyl esters such as chloroethyl acrylate, and mixtures of these monomers.

Monomers with more than one polymerisable double bond can be copolymerised for the purpose of crosslinking. Preferred examples of crosslinking monomers are esters of unsaturated monocarboxylic acids with 3 to 8 C atoms and unsaturated monohydric alcohols with 3 to 12 C atoms or saturated polyols with 2 to 4 OH groups and 2 to 20 C atoms, such as e.g. ethylene glycol dimethacrylate, allyl methacrylate; polyunsaturated heterocyclic compounds, such as e.g. trivinyl and triallyl cyanurate; polyfunctional vinyl compounds, such as di- and trivinylbenzenes; but also triallyl phosphate and diallyl phthalate.

Preferred crosslinking monomers are allyl methacrylate, ethylene glycol dimethy acrylate, diallyl phthalate and heterocyclic compounds having at least 3 ethylenically unsaturated groups.

Particularly preferred crosslinking monomers are the cyclic monomers triallyl cyanurate, triallyl isocyanurate, trivinyl cyanurate, triacryloylhexahydro-s-triazine, triallyl benzenes.

The quantity of the crosslinking monomers is preferably 0.02 to 5, especially 0.05 to 2 wt. %, based on the polymer backbone τ.

When using cyclic crosslinking monomers with at least 3 ethylenically unsaturated groups, it is advantageous to limit the quantity to less than 1 wt. % of the polymer backbone τ.

Preferred "other" polymerisable, ethylenically unsaturated monomers that can optionally be used for the preparation of the polymer backbone τ in addition to the acrylates are e.g. acrylonitrile, styrene, α-methylstyrene, acrylamide, vinyl $C_1$–$C_6$ alkyl ether, methyl methacrylate, butadiene. Preferred polyacrylate rubbers as polymer backbone τ are emulsion polymers having a gel content of at least 60 wt. %.

Other suitable polymer backbones according to B.2 are silicone rubbers with graft-active points as described in DE-OS 3 704 657, DE-OS 3 704 655, DE-OS 3 631 540 and DE-OS 3 631 539.

The gel content of the polymer backbone B.2 is determined at 25° C. in dimethylformamide (M. Hoffmann, H. Krömer, R. Kuhn, Polymeranalytik I and II, Georg Thieme-Verlag, Stuttgart 1977).

The graft polymers B can be prepared by known processes such as bulk, suspension, emulsion or bulk suspension processes.

Since it is known that, during the grafting reaction, the grafting monomers are not necessarily completely grafted on to the polymer backbone, graft polymers B according to the invention are also understood to be those products obtained by polymerisation of the graft monomers in the presence of the polymer backbone.

The average particle size $d_{50}$ is the diameter above and below which 50 wt. % of the particles respectively lie. It can be determined by means of ultracentrifuge measurement (W. Scholtan, H. Lange, Kolloid, Z. und Z. Polymere 250 (1972), 782–796).

Since it is known that, during the grafting reaction, the grafting monomers are not necessarily completely grafted on to the polymer backbone, graft polymers B according to the invention are also understood to be those products obtained by (co)polymerisation of the graft monomers in the presence of the polymer backbone and formed during working up.

Component C

Component C comprises one or more thermoplastic vinyl (co)polymers C.1, polyalkylene terephthalates C.2 or mixtures thereof.

Suitable as (co)polymers C.1 are polymers of at least one monomer from the group of vinyl aromatics, vinyl cyanides, such as unsaturated nitrites, $C_1$–$C_8$ alkyl (meth)acrylates, unsaturated carboxylic acids and derivatives such as anhydrides and imides of unsaturated carboxylic acids.

Especially suitable are (co)polymers of

C.1.1 50 to 99 parts by weight of vinyl aromatics and/or ring-substituted vinyl aromatics, such as e.g. styrene, α-methylstyrene, p-methylstyrene, p-chlorostyrene, and/or $C_1$–$C_4$ alkyl methacrylates such as e.g. methyl methacrylate, ethyl methacrylate, and C.1.2 1 to 50 parts by weight of vinyl cyanides such as unsaturated nitrites, e.g. acrylonitrile and methacrylonitrile and/or $C_1$–$C_8$ alkyl (meth)acrylates, e.g. methyl methacrylate, n-butyl acrylate, t-butyl acrylate, and/or unsaturated carboxylic acids such as maleic acid and/or derivatives, such as anhydrides and imides of unsaturated carboxylic acids, such as e.g. maleic anhydride and N-phenylmaleimide.

The (co)polymers C.1 are resinous, thermoplastic and rubber-free.

Copolymers of C.1.1 styrene and C.1.2 acrylonitrile are particularly preferred.

The (co)polymers according to C.1 are known and can be prepared by radical polymerisation, especially by emulsion, suspension, solution or bulk polymerisation. The (co)polymers according to component C preferably possess molecular weights $M_w$ (weight average, determined by light scattering or sedimentation) of between 15 000 and 200 000.

The polyalkylene terephthalates of component C.2 are reaction products of aromatic dicarboxylic acids or their reactive derivatives, such as dimethyl esters or anhydrides, and aliphatic, cycloaliphatic or araliphatic diols and mixtures of these reaction products.

Preferred polyalkylene terephthalates contain at least 80 wt. %, preferably at least 90 wt. %, based on the dicarboxylic acid component, terephthalic acid groups and at least 80 wt. %, preferably at least 90 mole %, based on the diol component, ethylene glycol and/or 1,4-butanediol groups.

In addition to terephthalic acid esters, the preferred polyalkylene terephthalates can contain up to 20 mole %, preferably up to 10 mole %, groups of other aromatic or cycloaliphatic dicarboxylic acids with 8 to 14 C atoms or aliphatic dicarboxylic acids with 4 to 12 C atoms, such as e.g. groups of phthalic acid, isophthalic acid, 2,6-naphthalenedicarboyxlic acid, 4,4'-diphenyldicarboxylic acid, succinic acid, adipic acid, sebacic acid, azelaic acid, cyclohexanediacetic acid.

In addition to ethylene glycol or 1,4-butanediol groups, the preferred polyalkylene terphthalates can contain up to 20 mole %, preferably up to 10 mole %, other aliphatic diols with 3 to 12 C atoms or cycloaliphatic diols with 6 to 21 C atoms, e.g. groups of 1,3-propanediol, 2-ethyl-1,3-propanediol, neopentyl glycol, 1,5-pentanediol, 1,6-hexanediol, 1,4-cyclohexanedimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3- propanediol, 2,5-hexanediol, 1,4-di(β-hydroxyethoxy) benzene, 2,2-bis(4-hydroxycyclohexyl)propane, 2,4-dihydroxy-1,1,3,3-tetramethylcyclobutane, 2,2-bis(4-β-hydroxyethoxyphenyl)propane and 2,2-bis(4-hydroxypropoxyphenyl)propane (DE-OS 2 407 674, 2 407 776, 2 715 932).

The polyalkylene terephthalates can be branched by incorporating relatively small quantities of 3- or 4-hydric alcohols or 3- or 4-basic carboxylic acids, e.g. according to DE-OS 1 900 270 and U.S. Pat. No. 3,692,744. Examples of preferred branching agents are trimesic acid, trimellitic acid, trimethylolethane and -propane and pentaerythritol.

Particularly preferred are polyalkylene terephthalates which have been prepared solely from terephthalic acid and the reactive derivatives thereof (e.g. its dialkyl esters) and ethylene glycol and/or 1,4-butanediol, and mixtures of these polyalkylene terephthalates.

Mixtures of polyalkylene terephthalates contain 1 to 50 wt. %, preferably 1 to 30 wt. %, polyethylene terephthalate and 50 to 99 wt. %, preferably 70 to. 99 wt. %, polybutylene terephthalate.

The polyalkylene terephthalates preferably used generally possess an intrinsic viscosity of 0.4 to 1.5 dl/g, preferably 0.5 to 1.2 dl/g, measured in phenol/o-dichlorobenzene (1:1 parts by weight) at 25° C. in an Ubbelohde viscometer.

The polyalkylene terephthalates can be prepared by known methods (cf. e.g. Kunststoff-Handbuch, vol. VIII, p. 695 et seq., Carl-Hanser-Verlag, Munich 1973).

Component D

The moulding compositions according to the invention contain as flame retardants at least one phosphonate amine of formula (I)

$$A_{3-y}-N-B_y \quad (I),$$

in which $$\underset{R^2}{\overset{R^1}{>}}C\underset{CH_2-O}{\overset{CH_2-O}{>}}\overset{O}{\underset{\|}{P}}-CH_2- \quad \text{or} \quad \underset{R^4-O}{\overset{R^3-O}{>}}\overset{O}{\underset{\|}{P}}-CH_2-$$

A denotes wherein $R^1$, $R^2$, $R^3$ and $R^4$ and also B and y have the meaning given above.

B preferably denotes, independently, hydrogen, ethyl, n- or iso-propyl, which can be substituted by halogen, unsubstituted $C_6$–$C_{10}$ aryl or $C_6$–$C_{10}$ aryl substituted by $C_1$–$C_4$ alkyl and/or halogen, especially phenyl or naphthyl.

Alkyl in $R^1$, $R^2$, $R^3$ and $R^4$ independently denotes preferably methyl ethyl, n-propyl, iso-propyl, n-, iso-, sec.- or tert.-butyl, pentyl or hexyl.

Substituted alkyl in $R^1$, $R^2$, $R^3$ and $R^4$ independently denotes preferably halogen-substituted $C_1$–$C_{10}$ alkyl, especially mono- or disubstituted methyl ethyl, n-propyl, iso-propyl, n-, iso-, sec.- or tert.-butyl, pentyl or hexyl.

$R^3$ and $R^4$, together with the carbon to which they are bonded, preferably form cyclopentyl, cyclohexyl, cycloheptyl or cyclooctyl, especially cyclopentyl or cyclohexyl.

In $R^1$, $R^2$, $R^3$ and $R^4$, $C_6$–$C_{10}$ aryl independently denotes preferably phenyl, naphthyl or binaphthyl, especially o-phenyl, o-naphthyl, o-binaphthyl, which can be substituted (generally mono-, di- or trisubstituted) by halogen.

The following are mentioned as preferable and by way of examples: 5,5,5'5",5"-hexamethyltris(1,3,2-dioxaphosphorinanemethane)amin-2,2',2"-trioxide of formula (I-1)

$$\left[\begin{array}{c}\diagup\diagdown\text{O}\phantom{xx}\text{O}\\ \diagdown\diagup\phantom{x}\overset{\|}{P}-CH_2-\\ \text{O}\phantom{xxxx}\end{array}\right]_3-N \quad (I\text{-}1)$$

(experimental product XPM 1000 from Solutia Inc., St. Louis, USA) 1,3,2-dioxaphosphorinane-2-methanamine, N-butyl-N[(5,5-dimethyl-1,3,2-dioxaphosphorinan-2-yl) methyl]-5,5-dimethyl-, P,2-dioxides; 1,3,2-dioxaphosphorinane-2-methanamine, N-[(5,5-dimethyl-1,3,2-dioxaphosphorinan-2-yl)methyl]-5,5-dimethyl-N-phenyl-, P,2-dioxide; 1,3,2-dioxaphosphorinane-2-methanamine, N,N-dibutyl-5,5-dimethyl-, 2-oxide, 1,3,2-dioxaphosphorinane-2-methanamine, N-[(5,5-dimethyl-1,3,2-dioxaphosphorinan-2-yl)methyl]-N-ethyl-5,5-dimethyl-, P,2-dioxide, 1,3,2-dioxaphosphorinane-2-methanamine, N-butyl-N-[(5,5-dichloromethyl-1,3,2-dioxaphosphorinan-2-yl)methyl]-5,5-dichloromethyl-, P,2-dioxide, 1,3,2-dioxaphosphorinane-2-methanamine, N-[(5,5-dichloromethyl-1,3,2-dioxaphosphorinan-2-yl)methyl]-5,5-dichloromethyl-N-phenyl, P,2-dioxide; 1,3,2-dioxaphosphorinane-2-methanamine, N,N-di-(4-chlorobutyl)-5,5-dimethyl-2-oxides; 1,3,2-dioxaphosphorinane-2-methanimine, N-[(5,5-dimethyl-1,3,2-dioxaphosphorinan-2-yl)methane]-N-(2-chloroethyl)-5,5-di(chloromethyl)-, P2-dioxide.

The following are also preferred:

Compounds of formulae (I-2) or (I-3)

$$\left[\underset{R^2}{\overset{R^1}{>}}C\underset{CH_2-O}{\overset{CH_2-O}{>}}\overset{O}{\underset{\|}{P}}-CH_2-\right]_3-N \quad (I\text{-}2)$$

$$\left[\underset{R^4-O}{\overset{R^3-O}{>}}\overset{O}{\underset{\|}{P}}-CH_2-\right]_3-N \quad (I\text{-}3)$$

wherein $R^1$, $R^2$, $R^3$ and $R^4$ have the meanings given above.

Compounds of formulae (I-2), (I-1) are particularly preferred. The individual compounds mentioned above are also particularly preferred.

The compounds of formula (I) can be prepared by the following methods:

a) $PCl_3$ is added to a mixture of 1,3-diol derivatives, water and an organic solvent at a temperature of 10–60° C. A 5,5-substituted 1,3,2-dioxaphosphorinane-2-oxide of formula (Ia)

$$\underset{R^2}{\overset{R^1}{>}}C\underset{CH_2-O}{\overset{CH_2-O}{>}}\overset{O}{\underset{\|}{P}}-H, \quad (Ia)$$

is obtained, wherein $R^1$ and $R^2$ have the meaning given above, b) after purification, the 1,3,2-dioxaphosphorinane-2-oxide is reacted in para-formaldehyde with an amine $B_yNH_{3-y}$, wherein B and y have the meaning given above, c) after purifying again and drying, the phosphonate amine of formula (I) is obtained.

A detailed description of the preparation method can be taken from U.S. Pat. No. 5,844,028.

Component E

The fluorinated polyolefins E are of high molecular weight and possess glass transition temperatures of more than −30° C., generally more than 100° C., fluorine contents, preferably of 65 to 76, especially of 70 to 76 wt. %, average particle diameters $d_{50}$ of 0.05 to 1 000, preferably 0.08 to 20 μm. The fluorinated polyolefins E generally have a density of 1.2 to 2.3 g/cm$^3$. Preferred fluorinated polyolefins E are polytetrafluoroethylene, polyvinylidene fluoride, tetrafluoroethylene (hexafluoropropylene and ethylene/tetrafluoroethylene copolymers. The fluorinated polyolefins are known (cf. "Vinyl and Related Polymers" by Schildknecht, John Wiley & Sons, Inc., New York, 1962, pages 484–494; "Fluorpolymers" by Wall, Wiley-Interscience, John Wiley & Sons, Inc., New York, volume 13, 1970, pages 623–654; "Modem Plastics Encyclopedia", 1970–1971, volume 47, part 10 A, October 1970, McGraw-Hill Inc., New York, pages 134 and 774; "Modern Plastics Encyclopedia", 1975–1976, October 1975, volume 52, part 10 A, McGraw-Hill Inc., New York, pages 27, 28 and 472 and U.S. Pat. Nos. 3,671,487, 3,723,373 and 3,838,092).

They can be prepared by known methods, for example by polymerisation of tetrafluoroethylene in an aqueous medium with a free radical-forming catalyst, e.g. sodium, potassium or ammonium peroxydisulfate at pressures of 7 to 71 kg/cm$^2$ and at temperatures of 0 to 200° C., preferably at temperatures of 20 to 100° C. (For further details, cf. e.g. U.S. Pat. No. 2,393,967). Depending on the form in which they are used, the density of these materials can be between 1.2 and 2.3 g/cm$^3$, and the average particle size between 0.5 and 1 000 μm.

Preferred fluorinated polyolefins E according to the invention are tetrafluoroethylene polymers with average particle diameters of 0.05 to 20 μm, preferably 0.08 to 10 μm, and a density of 1.2 to 1.9 g/cm$^3$, and are preferably used in the form of a coagulated mixture of emulsions of the tetrafluoroethylene polymers E with emulsions of the graft polymers B.

Suitable fluorinated polyolefins E which can be used in powdered form are tetrafluoroethylene polymers with average particle diameters of 100 to 1 000 μm and densities of 2.0 g/cm$^3$ to 2.3 g/cm$^3$.

Other preferred preparations are the fluorinated polyolefins E:

E.1) as a coagulated mixture with at least one of components A to C, the fluorinated polyolefin E or polyolefin mixture in the form of an emulsion being mixed with at least one emulsion of components A to C and then coagulated or E.2) as a precompound with at least one of components A to C, the fluorinated polyolefins E in the form of a powder being blended with a powder or granules of at least one of components A to C and compounded in the melt, generally at temperatures of 208° C. to 330° C. in the conventional equipment such as internal mixers, extruders or double-shaft screws.

Preferred preparations for the fluorinated polyolefins E are coagulated mixtures with a graft polymer B or a vinyl (co)polymer C.1.

To prepare a coagulated mixture of B and E, an aqueous emulsion (latex) of a graft polymer B is first blended with a fine-particle emulsion of a fluorinated polyolefin E; suitable emulsions of fluorinated polyolefins usually possess solids contents of 30 to 70 wt. %, especially 50 to 60 wt. %, preferably 30 to 35 wt. %.

The quantity stated in the description of components A, B and C does not contain the proportion of the graft polymer, vinyl (co)polymer or polycarbonate for the coagulated mixture according to E.1) and E.2).

The equilibrium ratio of graft polymer B or (co)polymers to the fluorinated polyolefin E in the emulsion mixture is 95:5 to 60:40, preferably 90:10 to 50:50. The emulsion mixture is then coagulated by known means, e.g. by spray drying, freeze drying or coagulation by means of adding inorganic or organic salts, acids, bases or organic, water-miscible solvents, such as alcohols, ketones, preferably at temperatures of 20 to 150° C., especially 50 to 100° C. If necessary, drying may be carried out at 50 to 200° C., preferably 70 to 100° C.

Suitable tetrafluoroethylene polymer emulsions are commercial products and are available for example from DuPont as Teflon 30 N.

The moulding compositions according to the invention can contain at least one of the conventional additives, such as lubricants and mould release agents, nucleating agents, antistatic agents, stabilisers and dyes, pigments and/or reinforcing material. Suitable inorganic reinforcing materials are glass fibres, optionally cut or ground, glass beads, glass spheres, lamellar reinforcing material such as kaolin, talc, mica, carbon fibres. Cut or ground glass fibres, preferably with a length of 1 to 10 mm and a diameter of <20 μm are preferably used as reinforcing material in a quantity of 1 to 40 parts by weight; the glass fibres are preferably surface-treated.

In addition, the moulding compositions according to the invention can contain at least one polar compound of at least one of the metals of main groups 1 to 5 or of subgroups 1 to 8 of the periodic table with at least one element selected from the group of oxygen, sulfur, boron, carbon, phosphorus, nitrogen, hydrogen and silicon as an extremely finely divided inorganic powder. An oxide or hydroxide, preferably $TiO_2$, $SiO_2$, $SnO_2$, ZnO, boehmite, $ZrO_2$, $Al_2O_3$, iron oxides, m thereof and doped compounds are preferably used as the polar compound, particularly preferably boehmite or $TiO_2$, with an average particle diameter of <200 nm, preferably 0.1–100 nm, particularly preferably 1–50 nm.

The moulding compositions according to the invention can contain one or more additional flame retardants, optionally having a synergistic action. Organic halogen compounds such as decabromobisphenyl ether, tetrabromobisphenol, inorganic halogen compounds such as ammonium bromide, nitrogen compounds such as melamine, melamine-formaldehyde resins, inorganic hydroxide compounds such as Mg, Al hydroxide, inorganic compounds such as antimony oxides, barium metaborate, hydroxoantimonate, zirconium oxide, zirconium hydroxide, molybdenum oxide, ammonium molybdate, zinc borate, ammonium borate and tin oxide and also siloxane compounds are mentioned as examples of other flame retardants. These flame retardants are generally added in a quantity of up to 20 wt. % (based on the total moulding composition).

In addition, phosphorus compounds of formula (VI)

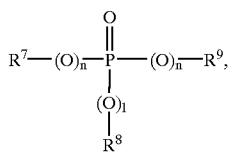 (VI)

in which

R⁷, R⁸ and R⁹, independently of one another, are an optionally halogenated $C_1$–$C_8$ alkyl or an optionally halogenated and/or alkylated $C_5$–$C_6$ cycloalkyl or an optionally halogenated and/or alkylated and/or aralkylated $C_6$–$C_{30}$ aryl, and "n" and "l", independently of one another, are 0 or 1, are suitable as flame retardants These phosphorus compounds are generally known (cf. e.g. Ullmann, Enzyklopädie der technischen Chemie, vol. 18, pages 301 et seq., 1979 and EP-A 345 522. The aralkyated phosphorus compounds are described e.g. in DE-OS 38 24 356.

Optionally halogenated $C_1$–$C_8$ alkyl groups according to (VI) can be mono- or polyhalogenated, linear or branched Examples of alkyl groups are chloroethyl, 2-chloropropyl, 2,3-dibromopropyl, butyl methyl or octyl.

Optionally halogenated and/or alkylated $C_5$–$C_6$ cycloalkyls according to (VI) are optionally mono- to polyhalogenated and/or alkylated $C_5$ or $C_6$ cycloalkyls, i.e. e.g. cyclopentyl, cyclohexyl, 3,3,5-trimethylcyclohexyl and completely chlorinated cyclohexyl.

Optionally halogenated and/or alkylated and/or aralkylated $C_6$–$C_{30}$ aryl groups according to (VI) are optionally mono- or polynuclear, mono- or polyhalogenated and/or alkylated and/or aralkylated, e.g. chlorophenyl, bromophenyl, pentachlorophenyl, pentabromophenyl, phenyl, cresyl, isopropylphenyl, benzyl-substituted phenyl and naphthyl.

R⁷, R⁸ and R⁹ preferably denote, independently of one another, methyl, ethyl, butyl, octyl, phenyl, cresyl, cumyl or naphthyl. R⁵, R⁶ and R⁷ particularly preferably denote, independently of one another, methyl, ethyl, butyl, phenyl optionally substituted by methyl and/or ethyl.

Phosphorus compounds according to formula (VI) which can be used according to the invention are e.g. tributyl phosphate, tris(2-chloroethyl)phosphate, tris(2,3-dibromopropyl)phosphate, triphenyl phosphate, tricresyl phosphate, diphenyl cresyl phosphate, diphenyl octyl phosphate, diphenyl-2-ethyl cresyl phosphate, tri(isopropyl phenyl)phosphate, tris(p-benzyl phenyl)phosphate, triphenylphosphine oxide, dimethyl methanephosphonate, dipentyl methanephosphonate and diethyl phenylphosphonate.

Dimeric and oligomeric phosphates, as described e.g. in EP-A 0 363 608, are also suitable flame retardants.

The moulding compositions according to the invention can contain phosphorus compounds according to formula (VII)

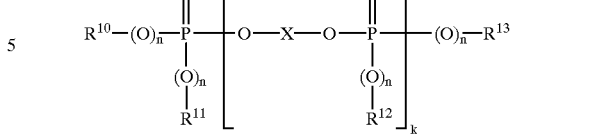 (VII)

as flame retardants.

In the formula, R¹⁰, R¹¹, R¹² and R¹³, independently of one another, denote $C_1$–$C_8$ alkyl $C_5$–$C_6$ cycloalkyl, $C_6$–$C_{20}$ aryl or $C_7$–$C_{12}$ aralkyl, optionally halogenated in each case.

R¹⁰, R¹¹, R¹² and R¹³ preferably denote, independently of one another, $C_1$–$C_4$ alkyl, phenyl, naphthyl or phenyl-$C_1$–$C_4$ alkyl. For their part the aromatic groups R¹⁰, R¹¹, R¹² and R¹³ can be substituted with halogen and/or alkyl groups, preferably chlorine, bromine and/or $C_1$–$C_4$ alkyl. Particularly preferred aryl groups are cresyl, phenyl, xylenyl, propylphenyl or butylphenyl and the corresponding brominated and chlorinated derivatives thereof.

X in formula (VII) signifies a mono- or polynuclear aromatic group with 6 to 30 C atoms. This is preferably derived from diphenols of formula (III). Diphenylphenol, bisphenol A, resorcinol or hydroquinone or the chlorinated or brominated derivatives thereof are particularly preferred.

n in formula (VII) can be 0 or 1, independently of one another, n preferably being equal to 1.

k denotes values from 0 to 30, preferably an average value of 0.3 to 20, particularly preferably 0.5 to 10, especially 0.5 to 6.

Mixtures of 10 to 90 wt. %, preferably 12 to 40 wt. %, of at least one monophosphorus compound of formula (VI) and at least one oligomeric phosphorus compound, or a mixture of oligomeric phosphorus compounds as described in EP-A 363 608 and phosphorus compounds according to formula (VII) can also be used in quantities of 10 to 90 wt. %, preferably 60 to 88 wt. %, based on the total quantity of phosphorus compounds.

Monophosphorus compounds of formula (VI) are especially tributyl phosphate, tris(2-chloroethyl)phosphate, tris(2,3-dibromopropyl)phosphate, triphenyl phosphate, tricresyl phosphate, diphenyl cresyl phosphate, diphenyl octyl phosphate, diphenyl-2-ethyl cresyl phosphate, tri(isopropyl phenyl)phosphate, halogen-substituted aryl phosphates, dimethyl methylphosphonate, diphenyl methylphosphonate, diethyl phenylphosphonate, triphenylphosphine oxide or tricresylphosphine oxide.

The mixtures of monomeric and oligomeric phosphorus compounds of formula (VII) have average k values of 0.3 to 20, preferably 0.5 to 10, especially 0.5 to 6.

The phosphorus compounds mentioned are known (cf. e.g. EP-A 363 608, EP-A 640 655) or can be prepared by known methods in an analogous fashion (e.g. Ullmanns Encyklopädie der technischen Chemie, vol. 18, p. 301 et seq., 1979; Houben-Weyl, Methoden der organischen Chemie, vol. 12/1, p. 43; Beilstein vol. 6, p. 177).

The moulding compositions according to the invention containing the components A to E and optionally other known additives such as stabilisers, dyes, pigments, lubricants and mould release agents, nucleating agents, nanoparticles and also antistatic agents and reinforcing materials and flame retardants, are prepared in that the respective components are blended by known means and melt-compounded and melt-extruded at temperatures of 200° C. to 300° C. in conventional equipment such as internal mixers, extruders and double-shaft screws, component E preferably being used in the form of the coagulated mixture already mentioned.

The individual components can be blended by known means both successively and simultaneously, both at about 20° C. (ambient temperature) and at elevated temperature.

The moulding compositions of the present invention can be used for the production of mouldings of all types. In particular, mouldings can be produced by injection moulding. Examples of mouldings which can be produced are: housing parts of all types, e.g. for domestic appliances such as juice presses, coffee machines, mixers, for office machinery such as monitors, printers, copiers or covers for the building sector and parts for the automotive sector. They are also used in the electrical engineering sector because they have very good electrical properties.

The moulding compositions according to the invention can also be used for example to produce the following mouldings or moulded parts:

parts for internal fittings in rail vehicles, hub caps, housings for electrical appliances containing small transformers, housings for equipment for the dissemination and transfer of information, housings and cladding for medical purposes, massagers and housings therefor, toy vehicles for children, prefabricated wall panels, housings for safety equipment, rear spoilers, thermally insulated transport containers, facility for holding or caring for small animals, mouldings for sanitary and bath fittings, covering grid plates for ventilation openings, mouldings for summer houses and garden sheds and housings for gardening equipment.

The moulding compositions are particularly suitable for the production of mouldings where particularly high heat resistance is required of the plastics used (e.g. current-carrying components).

Another form of processing is the production of mouldings by thermoforming from previously produced sheets or films.

Thus, the present invention also provides the use of the moulding compositions according to the invention for the production of mouldings of any type, preferably of the types mentioned above, and the mouldings made from the moulding compositions according to the invention.

EXAMPLES

Component A

A$_1$ Linear polycarbonate based on bisphenol A with a relative solution viscosity of 1.252, measured in CH$_2$Cl$_2$ as solvent at 25° C. in a concentration of 0.5 g/100 ml.

A$_2$ Linear polycarbonate based on bisphenol A with a relative solution viscosity of 1.203, measured in CH$_2$Cl$_2$ as solvent at 25° C. in a concentration of 0.5 g/100 ml.

Component B

Graft polymer of 45 parts by weight of a copolymer of styrene and acrylonitrile in a weight ratio of 72:28 on 55 parts by weight of particulate, crosslinked polybutadiene rubber (average particle diameter d$_{50}$=0.4 μm), prepared by emulsion polymerisation.

Component C

Styrene/acrylonitrile copolymer with a styrene/acrylonitrile weight ratio of 72:28 and an intrinsic viscosity of 0.55 dl/g (measured in dimethylformamide at 20° C.).

Component D

Phosphonate amine of the formula:

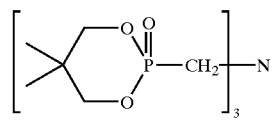

(development product XPM 1000 from Solutia Inc., St. Louis, Mo.)

Component E

Blendex 446, General Electric, N.Y. USA: batch of SAN/Teflon in a 1:1 weight ratio.

Preparation and Testing of the Moulding Compositions According to the Invention

The components A to E are mixed in a 3-litre internal mixer. The mouldings are produced on an Arburg 270 E type injection moulding machine at 260° C.

The heat resistance is determined by the Vicat B method according to DIN 53 460.

The composition of the materials tested and the data obtained are compiled in the following table.

TABLE 1

| Composition and properties of the polycarbonate ABS moulding compositions | |
|---|---|
| Example | 1 |
| Component [parts by weight] | |
| A$_1$ | 41.70 |
| A$_2$ | 25.90 |
| B | 10.50 |
| C | 8.80 |
| D | 11.90 |
| E | 0.8 |
| Mould release agent | 0.4 |
| Properties | |
| Vicat B120 [° C.] | 116° |
| UL 94 V [3.2 mm] | V0 |
| Total duration of flame [s] | 5 |

The moulding compositions according to the invention, which are flame resistant, are distinguished by high heat resistance and are low-juicing, i.e. no deposits occur on the surface.

What is claimed is:

1. Composition containing polycarbonate and/or polyester carbonate and 0.1 to 30 parts by weight phosphonate amine of the general formula (I)

$$A_{3-y}-N-B_y \qquad (I),$$

wherein

A denotes

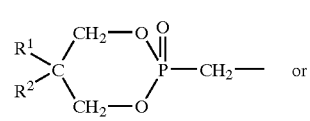

(IIa)

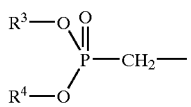

(IIb)

and

R¹ and R², independently of one another, denote unsubstituted or substituted $C_1$–$C_{10}$ alkyl or unsubstituted or substituted $C_6$–$C_{10}$ aryl, R³ and R⁴, independently of one another, denote unsubstituted or substituted $C_1$–$C_{10}$ alkyl or unsubstituted or substituted $C_6$–$C_{10}$ aryl, R³ and R⁴ together denote unsubstituted or substituted $C_3$–$C_{10}$ alkylene, y signifies the numerical values 0, 1 or 2 and B independently denotes hydrogen, optionally halogenated $C_2$–$C_8$ alkyl or unsubstituted or substituted $C_6$–$C_{10}$ aryl.

2. The composition according to claim 1 containing
A) 5 to 95 parts by weight of aromatic polycarbonate or polyester carbonate
B) 1 to 60 parts by weight of a graft polymer of
B.1 5 to 95 wt. % one or more vinyl monomers on
B.2 5 to 95 wt. % one or more polymer backbones with a glass transition temperature of <10° C. and an average particle size (d₅₀ value) of 0.05 to 5 μm,
C) 0 to 50 parts by weight of thermoplastic vinyl (co) polymer and/or polyalkylene terephthalate,
D) 0.1 to 30 parts by weight of a phosphonate amine or a mixture of formula (I)

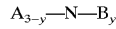

(I), in which

A, B and y have the meaning given in claim 1.

3. Blends according to claim 2 containing 2 to 25 parts by weight of component D.

4. Blends according to claim 2 containing 2 to 20 parts by weight of component D.

5. Blends according to claim 1 containing phosphonate amines selected from the group consisting of 5,5,5'5',5",5"-hexamethyltris(1,3,2-dioxaphosphorinanemethane)amin-2,2',2"-trioxide of formula (I-1)

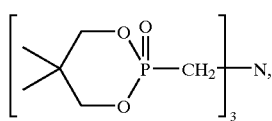

(I-1)

1,3,2-dioxaphosphorinane-2-methanamine, N-butyl-N[(5,5-dimethyl-1,3,2-dioxaphosphorinan-2-yl)methyl]-5,5-dimethyl-, P,2-dioxides; 1,3,2-dioxaphosphorinane-2-methanamine, N-[(5,5-dimethyl-1,3,2-dioxaphosphorinan-2-yl)methyl]-5,5-dimethyl-N-phenyl-, P,2-dioxide; 1,3,2-dioxaphosphorinane-2-methanamine, N,N-dibutyl-5,5-dimethyl-, 2-oxide, 1,3,2-dioxaphosphorinane-2-methanamine, N-[(5,5-dimethyl-1,3,2-dioxaphosphorinan-2-yl)methyl]-N-ethyl-5,5-dimethyl-, P,2-dioxide, 1,3,2-dioxaphosphorinane-2-methanamine, N-butyl-N-[(5,5-dichloromethyl-1,3,2-dioxaphosphorinan-2-yl)methyl]-5,5-dichloromethyl-, P,2-dioxide, 1,3,2-dioxaphosphorinane-2-methanamine, N-[(5,5-dichloromethyl-1,3,2-dioxaphosphorinan-2-yl)methyl]-5,5-dichloromethyl-N-phenyl, P,2-dioxide; 1,3,2-dioxaphosphorinane-2-methanamine, N,N-di-(4-chlorobutyl)-5,5-dimethyl-2-oxides; 1,3,2-dioxaphosphorinane-2-methanimine and N-[(5,5-dimethyl-1,3,2-dioxaphosphorinan-2-yl)methane]-N-(2-chloroethyl)-5,5-di(chloromethyl)-, P2-dioxide.

6. Blends according to claim 2 wherein component B) is a graft polymer of
B.1 5 to 95 parts by weight of a mixture of
B.1.1 50 to 99 parts by weight styrene, α-methylstyrene, styrenes substituted in the ring with halogen or methyl, methyl methacrylate or mixtures of these compounds and
B.1.2 1 to 50 parts by weight acrylonitrile, methacrylonitrile, methyl methacrylate, maleic anhydride, $C_1$–$C_4$ alkyl- or phenyl-N-substituted maleimides or mixtures of these compounds on
B.2 5 to 95 parts by weight polymer with a glass transition temperature of less than −10° C.

7. Blends according to claim 2 containing 10 to 90 parts by weight of component A) and 1 to 40 parts by weight of component B.

8. Blends according to claim 2 containing 20 to 80 parts by weight of component A and 2 to 30 parts by weight of component B.

9. Blends according to claim 6, wherein the polymer backbone B.2 is a diene rubber, polyacrylate rubber, silicone rubber or ethylene-propylene-diene rubber.

10. Blends according to claim 1 which contain 0.01 to 35 wt. %, based on the total moulding composition, of at least one additional flame retardant.

11. Blends according to claim 2 containing 1 to 30 parts by weight of component C).

12. A method of using the composition of claim 1 comprising producing a molded article.

13. A method of using the blend of claim 2 comprising producing a molded article.

14. A molded article comprising the composition of claim 1.

15. A molded article comprising the blend of claim 2.

16. A composition containing polycarbonate and/or polyester carbonate and 0.1 to 30 parts by weight of at least one phosphonate amine of general formula (I) of claim 1.

17. The composition of claim 2 wherein the graft polymer is based on at least two members selected from the group consisting of chloroprene, 1,3-butadiene, isoprene, styrene, substituted styrene, acrylonitrile, ethylene, propylene, vinyl acetate and (meth)acrylate having 1 to 18 carbon atoms in the alcohol component.

18. The composition according to claim 2 which further contains at least one additive selected from the group consisting of stabilisers, pigments, mould release agents, flow promoters, inorganic reinforcing materials, nanoparticles and antistatic agents.

19. The composition of claim 2 further containing a compound of main groups 1 to 5 or of subgroups 1 to 8 of the periodic table with at least one element selected from the group of oxygen, sulfur, boron, carbon, phosphorus, nitrogen, hydrogen and silicon, the compound having an average particle diameter of 0.1 to 100 nm.

* * * * *